(12) United States Patent
Ikeda et al.

(10) Patent No.: US 6,741,385 B2
(45) Date of Patent: May 25, 2004

(54) ELECTROPHORETIC DISPLAY DEVICE

(75) Inventors: Tsutomu Ikeda, Tokyo (JP); Yoshinori Uno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/175,842

(22) Filed: Jun. 21, 2002

(65) Prior Publication Data
US 2003/0016429 A1 Jan. 23, 2003

(30) Foreign Application Priority Data
Jun. 26, 2001 (JP) ........................................ 2001/193750

(51) Int. Cl.$^7$ .............................. G02B 26/00; G09G 3/34
(52) U.S. Cl. ....................... 359/296; 359/295; 345/107
(58) Field of Search ................... 359/295–297, 359/253, 266; 345/107

(56) References Cited

U.S. PATENT DOCUMENTS

| | | | | |
|---|---|---|---|---|
| 3,612,758 | A | 10/1971 | Evans et al. ................. | 178/5.4 |
| 4,203,106 | A | * 5/1980 | Dalisa et al. ................ | 359/296 |
| 5,345,251 | A | 9/1994 | DiSanto et al. ............. | 345/107 |
| 6,072,621 | A | 6/2000 | Kishi et al. ................... | 359/296 |
| 6,221,267 | B1 | 4/2001 | Ikeda et al. ................... | 216/24 |
| 2003/0011869 | A1 | * 1/2003 | Matsuda et al. ............ | 359/296 |
| 2003/0095094 | A1 | * 5/2003 | Goden ........................ | 345/107 |

FOREIGN PATENT DOCUMENTS

| | | |
|---|---|---|
| JP | 49-5598 | 2/1974 |
| JP | 49-24695 | 3/1974 |
| JP | 61-16074 | 4/1986 |
| JP | 8-507154 | 7/1996 |
| JP | 2740048 | 1/1998 |
| JP | 11-202804 | 7/1999 |

* cited by examiner

Primary Examiner—Scott J. Sugarman
Assistant Examiner—M. Hasan
(74) Attorney, Agent, or Firm—Fitzpatrick, Cella, Harper & Scinto

(57) ABSTRACT

An electrophoretic display device includes first and second substrates arranged in opposed relation to each other with a space, an insulating liquid arranged in the space and a plurality of colored and charged electrophoretic particles dispersed in the insulating liquid. On the basis of arrangement of a stage along the second substrate in the space between the substrates, a first surface opposing a thicker portion of the insulating liquid, a second surface opposing a thinner portion of the insulating liquid and a side wall of the stage, which connects the first surface to the second surface, are formed on the second substrate. A first electrode is arranged along the first surface, and a second electrode is arranged along the second surface. The display device has a third electrode arranged along at least a part of the side wall of the stage and forming an electrode face continuous with the first electrode.

12 Claims, 7 Drawing Sheets

ELECTROPHORETIC DISPLAY DEVICE

BACKGROUND OF THE INVENTION

1. Field of the Invention

The present invention relates to an electrophoretic display device in which charged electrophoretic particles in an insulating liquid are caused to migrate to make a display.

2. Related Background Art

Various types of electrophoretic display devices in which charged electrophoretic particles in an insulating liquid are caused to migrate to make a display have been proposed. Such an electrophoretic display device will hereinafter be described.

With the development of information instruments, the need of display devices of low consumption power and the thin type is increasing, and research and development of display devices are more and more made according to the need. Among others, liquid crystal display devices are actively developed as display devices that can meet such need and commercially provided. However, the current liquid crystal display devices involve problems that characters on a screen become hard to see by an angle at which the screen is seen or reflected light, and that a burden on sight caused by glaringness, low luminance of a light source, or the like is heavy. These problems are not yet sufficiently solved. For this reason, it is expected to develop reflection type display devices from the viewpoints of low consumption of power, lightening of the burden on sight, etc. These problems are not yet sufficiently solved. For this reason, it is expected to develop reflection type display devices from the viewpoints of low consumption of power, lightening of the burden on sight, etc.

An electrophoretic display device has been proposed by Paul F. Evans et al. as one of them (U.S. Pat. No. 3,612,758).

FIG. 9A illustrates an example of the construction of the electrophoretic display device. This kind of electrophoretic display device comprises a pair of substrates 1a, 1b arranged in a state spaced at a prescribed interval, an insulating liquid 2 filled between these substrates 1a and 1b, a great number of colored and charged electrophoretic particles 3 dispersed in the insulating liquid 2 and display electrodes 15a, 15b arranged at every pixel along the respective substrates 1a, 1b. Incidentally, reference numeral 7 indicates a partition wall provided between pixels to prevent colored and charged electrophoretic particles 3 from transferring to another pixel so as to maintain uniform display. In this device, colored and charged electrophoretic particles 3 are charged positively or negatively, and so they are adsorbed on any display electrode 15a or 15b according to the polarities of voltage applied to display electrodes 15a, 15b. Since insulating liquid 2 and colored and charged electrophoretic particles 3 are colored in different colors from each other, the color of the particles 3 is visually observed when colored and charged electrophoretic particles 3 are adsorbed on display electrode 15a on the side of an observer (see FIG. 9B). When colored and charged electrophoretic particles 3 are adsorbed on display electrode 15b on the other side, the color of insulating liquid 2 is visually observed (see FIG. 9A). Accordingly, the polarity of voltage applied controls every pixel, whereby various images can be displayed. The device of this type will hereinafter be referred to as "vertical migration type electrophoretic display device".

In the electrophoretic display device of such a vertical migration type, however, a coloring material such as a dye or ion must be mixed into insulating liquid 2, and the presence of such a coloring material is easy to act as an unstable factor in an electrophoretic operation because transfer of a new electric charge is brought about, and so performance, life and/or stability as a display device may have been lowered in some cases.

As those for solving such a problem, electrophoretic display devices of the type shown in FIGS. 10A and 10B (hereinafter referred to as "horizontal migration type electrophoretic display device") are disclosed in Japanese Patent Application Laid-Open Nos. 49-5598, 49-024695 and 11-202804. Such a horizontal migration type electrophoretic display device comprises a pair of substrates 1a, 1b arranged in a state spaced at a prescribed interval, an insulating liquid 2 filled between these substrates 1a and 1b, a great number of colored and charged electrophoretic particles 3 dispersed in the insulating liquid 2 and a pair of display electrodes 25a, 25b arranged at every pixel. The pair of display electrodes 25a, 25b are arranged side by side along one substrate 1b, and arranged so as not to hold insulating liquid 2 between them unlike the above-described type. In the case of such a horizontal migration type electrophoretic display device, the problem described above can be avoided because it is only necessary for the insulating liquid 2 to be transparent and there is no need to mix any coloring material. In this device, one display electrode 25a is coated with a color layer of the same color (for example, black) as that of the charged electrophoretic particles 3, and the other display electrode 25b is coated with a color layer of any other color (for example, white). The colored and charged electrophoretic particles 3 migrate horizontally (in a direction along the substrates) according to the polarities of voltage applied to display electrodes 25a, 25b and are adsorbed on display electrode 25a or 25b. When colored and charged electrophoretic particles 3 are adsorbed on display electrode 25a, the color of display electrode 25b is easier to be visually observed (see FIG. 10B). When colored and charged electrophoretic particles 3 are adsorbed on display electrode 25b, the whole pixel is visually observed with the same color as that of the charged electrophoretic particles 3 (see FIG. 10A). Accordingly, the polarity of voltage applied controls every pixel, whereby various images can be displayed.

When it is intended to achieve higher display contrast in such an electrophoretic display device as described above, it is required to narrow the area of electrode 25a and moreover cause all the charged electrophoretic particles 3 to be adsorbed on electrode 25a. However, there has been a limitation.

In addition, the system that display is conducted by voltage, such as electrophoretic display or liquid crystal display, has involved a problem that a leakage electric field occurs between various wirings and display electrodes to cause white skip or black skip in the vicinity of the wiring of a display pixel, thereby deteriorating display quality.

SUMMARY OF THE INVENTION

The present invention has been made with the foregoing circumstances in view and thus has as its object the provision of an electrophoretic display device which can achieve higher display contrast and prevent the deterioration of display quality.

The above object can be achieved by the present invention described below.

According to the present invention, there is provided an electrophoretic display device comprising first and second substrates arranged in opposed relation to each other with a space, an insulating liquid arranged into the space and a plurality of colored and charged electrophoretic particles dispersed in the insulating liquid, in which on the basis of arrangement of a stage along the second substrate in the space between the substrates, a first surface facing a thicker portion of the insulating liquid, a second surface facing a thinner portion of the insulating liquid and side wall of the stage, which connect the first surface to the second surface, are formed on the second substrate, a first electrode is arranged along the first surface, and a second electrode is arranged along the second surface, wherein the display device has a third electrode arranged along at least a part of the side wall of the stage and comprising an electrode face continuous with the first electrode.

DESCRIPTION OF THE PREFERRED EMBODIMENTS

The embodiments of the present invention will hereinafter be described with reference to FIGS. 1 to 6 and FIGS. 7A and 7B.

Figure 1:
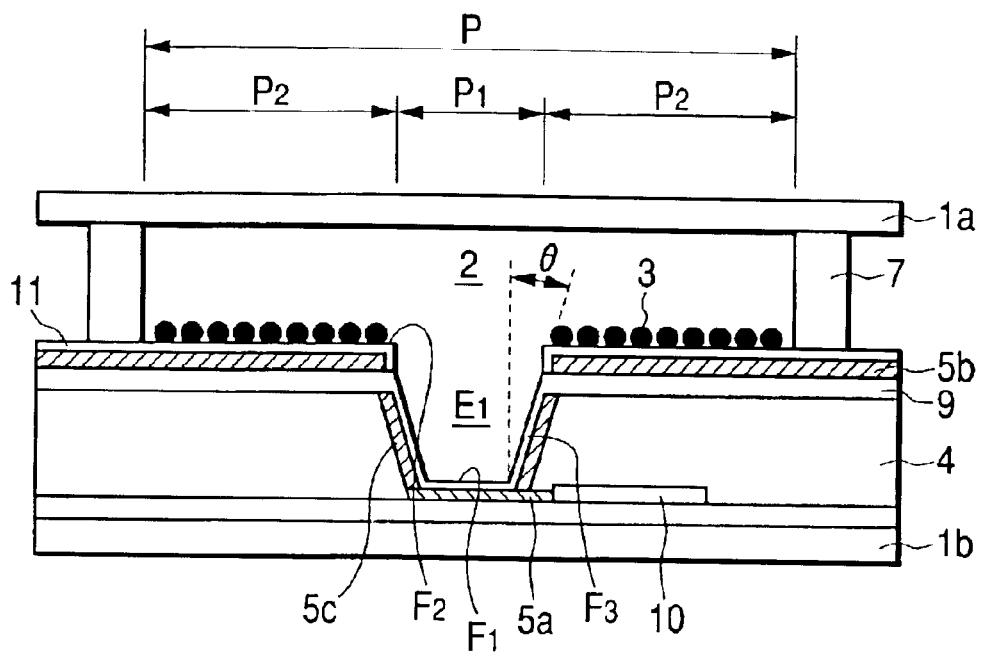
FIG. 1 illustrates an example of the construction of the electrophoretic display device according to the present invention.

As illustrated in, for example, FIG. 1, the electrophoretic display device according to the present invention comprises first and second substrates 1$a$ and 1$b$ arranged in a state spaced at a prescribed interval, an insulating liquid 2 arranged in the space between these substrates 1$a$ and 1$b$, and a plurality of colored and charged electrophoretic particles 3 dispersed in the insulating liquid 2.

On the basis of arrangement of a stage 4 having a recessed part E (hereinafter distinguished by reference characters $E_1$ to $E_6$ as needed) along second substrate 1$b$ in the space between these substrates 1$a$ and 1$b$, a first surface $F_1$, i.e., a lower surface, which is a bottom of the recessed part E, and a second surface, i.e. an upper surface $F_2$ of the stage 4, are formed so as to oppose to a thicker portion and a thinner portion of the insulating liquid 2, respectively. A side wall $F_3$ having any of various sectional forms, which will be described subsequently, is formed between lower surface $F_1$ and upper surface $F_2$.

Further, a first electrode 5$a$ is arranged in such a manner that at least a part thereof extends along lower surface $F_1$, and a second electrode 5$b$ is arranged in such a manner that at least a part thereof extends along upper surface $F_2$. More specifically, at least a part of first electrode 5$a$ (a portion extending along lower surface $F_1$) is arranged at a position more close to second substrate 1$b$ than second electrode 5$b$ is. The display device is so constructed that charged electrophoretic particles 3 are caused to migrate to first electrode 5$a$ or second electrode 5$b$ by applying voltage between first and second electrodes 5$a$ and 5$b$. For example, when a region $P_1$ in which first electrode 5$a$ has been formed is colored black, a region $P_2$ in which second electrode 5$b$ has been formed is colored white, and charged electrophoretic particles 3 are colored black, a black display is made when the charged electrophoretic particles 3 are arranged so as to cover second electrode 5$b$ (see FIG. 7A), while a white display is made when the charged electrophoretic particles 3 are arranged so as to cover first electrode 5$a$ (see FIG. 7B). The first and second electrodes will hereinafter be referred to as first display electrode and second display electrode, respectively.

Incidentally, second display electrode 5$b$ is only required that at least a part thereof is arranged along upper surface $F_2$, and may be supported on the side of either first substrate 1$a$ or second substrate 1$b$. However, second display electrode 5$b$ may preferably be supported on the side of second substrate 1$b$ for lessening or losing the influence of a leakage electric field from wiring on driving of charged electrophoretic particles 3.

The form of recessed part E will hereinafter be described.

Figure 2:
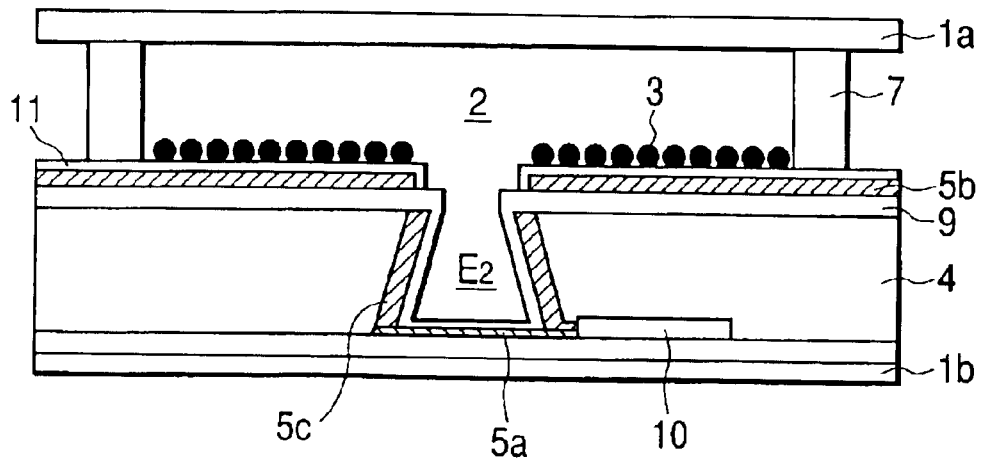
FIG. 2 illustrates another example of the construction of the electrophoretic display device according to the present invention.

A recessed part $E_1$ illustrated in FIG. 1 is formed in such a manner that an opening at an upper end is wider than lower surface $F_1$ at the bottom. However, it may be formed in such a manner that the opening at the upper end is narrower than lower surface $F_1$ at the bottom as shown by a reference character $E_2$ in FIG. 2. In a case that it is formed as illustrated in FIG. 1, there is a problem that an effect for receiving charged electrophoretic particles 3 becomes deteriorated when the inclination of the side wall portion of the recessed part is blunt. When an overhang is great in the form illustrated in FIG. 2, there arise such problems that the migration of the particles 3 to display electrode 5$b$ takes a longer time (migration of the particles is slowed), and a production process by a molding system or the like is difficult. Accordingly, it is necessary to determine the inclination angle of the side wall portion in view of such phenomena. Specifically, the inclination angle θ of the side wall portion in the construction shown in FIG. 1 may preferably be determined to be from 20° to 80°, particularly from 45° to 80°. The recessed parts $E_1$ and $E_2$ shown in FIGS. 1 and 2 are formed in such a manner that the inclination of the side wall portion is constant (namely, the side wall portion exhibits a conical surface). However, the inclination may be continuously changed so as to curve the side wall portion (see FIG. 3), or the side wall portion may be formed stepwise.

Figure 3:
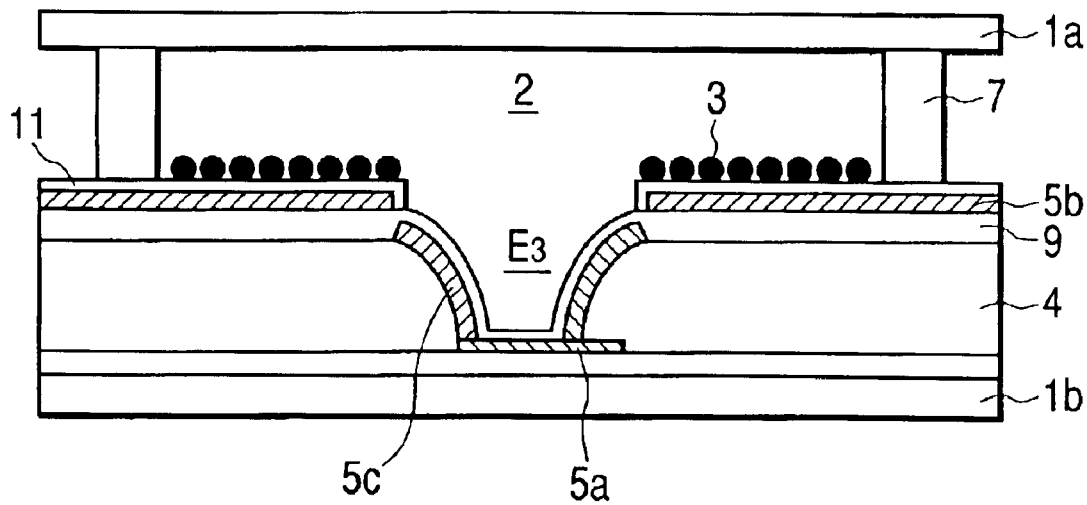
FIG. 3 illustrates a further example of the construction of the electrophoretic display device according to the present invention.

In the electrophoretic display devices illustrated in FIGS. 1 to 3, the recessed part E is arranged by only one at the almost central portion of a pixel P. However, the arrangement position and number thereof are not limited. A plurality of recessed parts may be formed at other positions than the central portion of the pixel. The form of the opening of the recessed part may be a circle, polygon or any other form.

An embodiment of the present invention has a feature that a third electrode 5c is provided as an electrode continuous with the first electrode 5a on the side wall $F_3$ of the stage. In other words, the above-described first display electrode 5a features that it is provided so as to extend from a position along the lower surface $F_1$ to the side wall portion of the recessed part E.

The electrode 5c is formed on the side wall $F_3$ so as to extend to the electrode 5a on the lower surface, thereby it is made possible to prevent an electric field formed by voltage applied between first electrode 5a and second electrode 5b when causing charged electrophoretic particles 3 to migrate from first electrode 5a to second electrode 5b from leaking into a dielectric member forming the stage 4 outside the recessed part E. As a result, the electric field within the recessed part can be strengthened to facilitate the migration of the charged electrophoretic particles and prevent them from remaining on the bottom of the recessed part.

Although the above-described effect may be brought about even by halfway covering the side wall $F_3$ with the extended portion of first display electrode 5a, i.e., third electrode 5c, the whole side wall portion may be covered with the third electrode so as to extend to the periphery of the recessed part at the upper surface $F_2$ as illustrated in FIG. 1. In such a case, the effect is more markedly exhibited.

Figure 4:
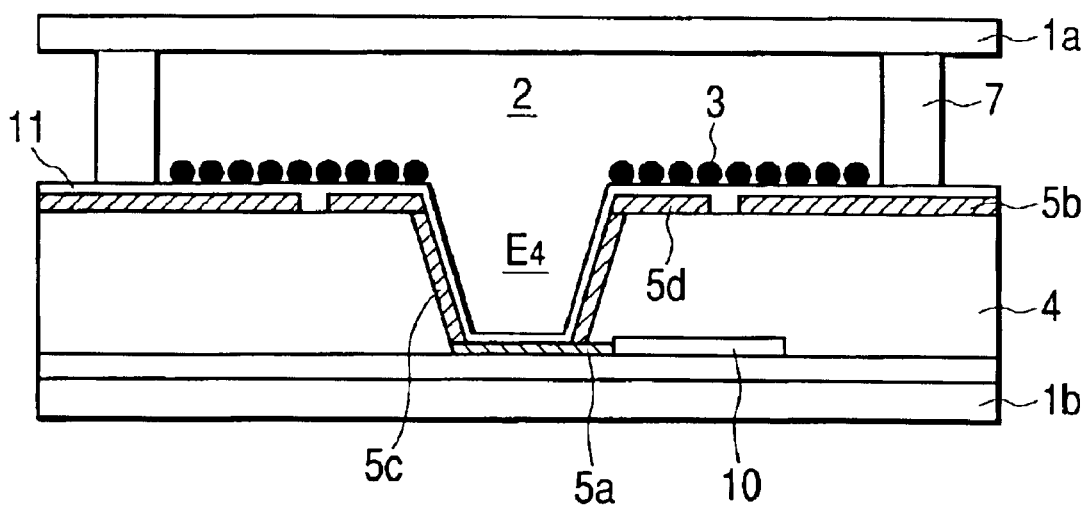
FIG. 4 illustrates a still further example of the construction of the electrophoretic display device according to the present invention.

An electrode 5d may also be provided on upper surface $F_2$ so as to form an electrode face continuous with first display electrode 5a and third electrode 5c. An example thereof is illustrated in FIG. 4. It goes without saying that the electrode 5d (may hereinafter be referred to as fourth electrode) on the upper surface must be insulated from second display electrode 5b. The fourth electrode 5d has an effect that the concentration of an electric field on upper surface $F_2$ on the periphery of recessed part E is relieved compared with the case where no electrode is provided. Therefore, the migration of the charged electrophoretic particles to second display electrode 5b is not concentrated only in the vicinity of the periphery of recessed part E, but extends to a place close to a partition wall 7 distant from the recessed part. As a result, the charged electrophoretic particles can be uniformly distributed on the second display electrode.

Figure 5:
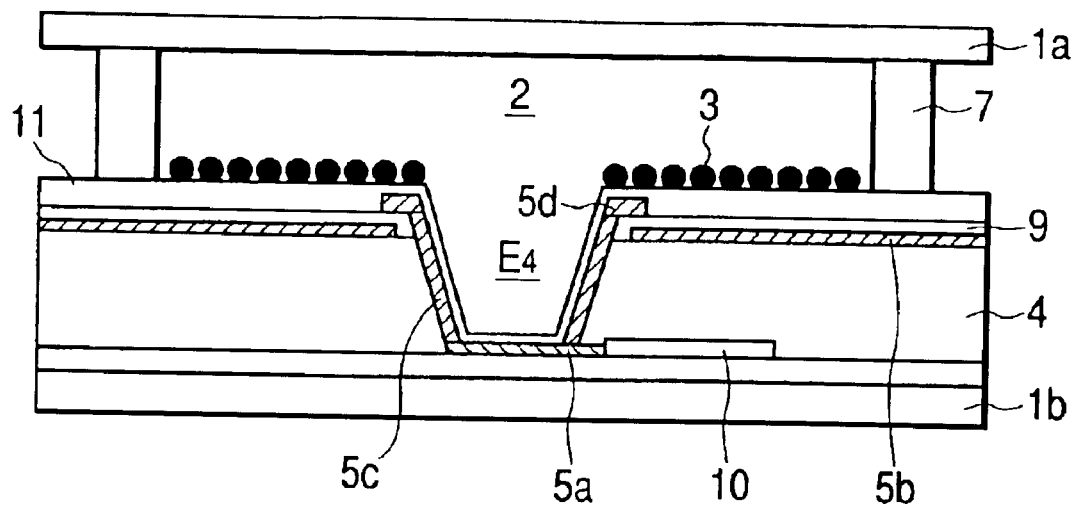
FIG. 5 illustrates a yet still further example of the construction of the electrophoretic display device according to the present invention.
Figure 6:
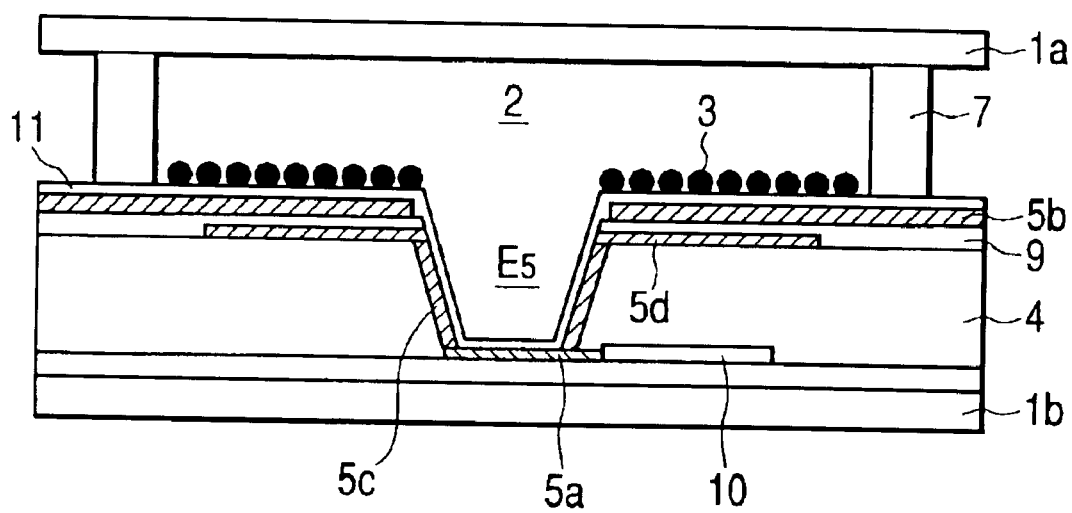
FIG. 6 illustrates a yet still further example of the construction of the electrophoretic display device according to the present invention.

As illustrated in FIG. 4, fourth electrode 5d may be laterally arranged with a space on the same second surface $F_2$ as the surface on which second display electrode 5b is provided. However, it may be arranged so as to overlap second display electrode 5b as illustrated in FIGS. 5 and 6. The overlapping has an effect that display contrast can be enhanced because the space, which is required of the lateral arrangement, can be eliminated to increase an effective area of display.

FIG. 5 illustrates an embodiment that the fourth electrode is overlapped on the second display electrode, and FIG. 6 illustrates an embodiment that the second display electrode is overlapped on the fourth electrode. There is no great difference in effect between both embodiments, and any embodiment may be suitable selected according to the easiness of a production process thereof.

In FIGS. 4 to 6, fourth electrode 5d not covered with second display electrode 5b or a part thereof may preferably be formed with a constant width along the periphery of recessed part E, whereby the migration of the particles from first display electrode 5a to second display electrode 5b occurs uniformly in all directions. When the width thereof is made very wide, however, the area of second display electrode 5b is relatively narrowed, thereby impairing display contrast. A preferable range of the area is such that the sum total of areas of first display electrode 5a, and third electrode 5c and fourth electrode 5d continuous therewith is narrower than that of second display electrode 5b.

Incidentally, when the electrophoretic display device is provided as a horizontal migration type, the insulating liquid 2 may preferably be made transparent to an extent that the charged electrophoretic particles 3 can be visually observed, and a region $P_1$ in which first display electrode 5a has been formed and a region $P_2$ in which second display electrode 5b has been formed may preferably be colored in colors different from each other. It may be preferred that one region be colored in the same color as in the colored and charged electrophoretic particles 3, and the other region be colored in a different color. For example, charged electrophoretic particles 3 may be colored black, the region $P_1$ in which first display electrode 5a has been formed may be colored black, and the region $P_2$ in which second display electrode 5b has been formed may be colored white. However, it goes without saying that the present invention is not limited thereto, and the combination of colors is free. When a color display is intended, it may be preferred that charged electrophoretic particles 3 be colored black, one region be colored black, and the other region be suitably colored red, green or blue. Examples of a coloring method include:

a method of coloring each electrode itself;

a method of providing colored layers separate from the electrodes; and a method of utilizing an insulating layer formed so as to cover the electrodes (for example, a method of utilizing the color of the insulating layer itself or mixing a coloring material into the insulating layer).

It may also be preferred that an insulating layer be formed so as to cover electrodes 5a, 5b. In the case where the insulating layer is formed, injection of an electric charge into charged electrophoretic particles 3 from the respective electrodes 5a, 5b, . . . , can be prevented. As a material of this insulating layer, is preferred a material hard to form pin holes even in a thin film and low in dielectric constant, specifically, an amorphous fluororesin, high-transparent polyimide, acrylic resin or the like. In particular, when fourth electrode 5d and second display electrode 5d are arranged so as to overlap each other as illustrated in FIGS. 5 and 6, it is necessary that an insulating layer 9 be formed between these electrodes 5d and 5b to avoid short circuit therebetween.

It is preferred that the above-described stage 4, lower surface $F_1$, upper surface $F_2$, side wall $F_3$, first display electrode 5a, second display electrode 5b and third electrode 5c (and also fourth electrode 5d in some cases) be formed at every pixel, and signals are supplied to the first display electrode 5a and the electrode(s) continuous therewith in each pixel through a switching element 10. The switching element 10 may preferably be connected to first display electrode 5a, and the second display electrodes 5b in the respective pixels may preferably be connected to one another in such a manner that the same signal is supplied thereto. Besides, parts necessary for display, such as a driver IC may preferably be arranged around wirings or the display device.

Figure 7A:
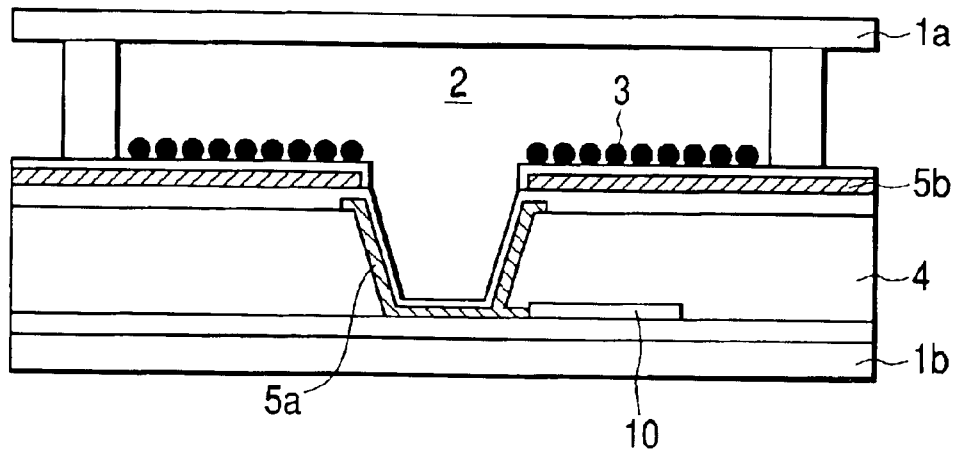
FIGS. 7A and 7B are drawings for explaining the driving of the electrophoretic display device according to the present invention.
Figure 7B:
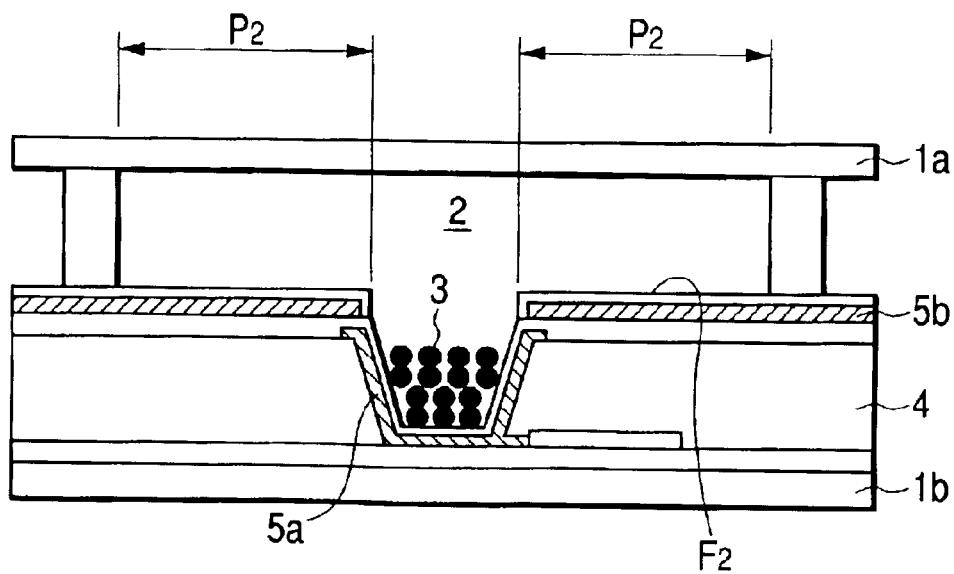

FIGS. 7A and 7B are cross-sectional views illustrating a pixel of a simple matrix drive display device according to the present invention. In this display device, a control electrode 6 is formed between a first display electrode 5a and a second display electrode 5b in place of the switching element such as a thin-film transistor for active matrix drive display. Besides, parts necessary for display, such as a driver IC are arranged around wirings or the display device (not illustrated). Other forms are the same as in the active matrix drive display device.

Other constructions will be described.

The stage 4 may preferably be formed with a photo-setting resin, thermosetting resin, thermoplastic resin or the like.

A partition wall member 7 may be arranged so as to surrounding the periphery of each pixel, thereby preventing transfer of charged electrophoretic particles 3 between pixels. As a material of the partition wall, the same material as the substrates 1a, 1b may be used, or a photosensitive resin such as an acrylic resin may also be used. Any process may be used for forming the partition wall. For example, a process of applying a photosensitive resin layer and then conducting exposure and wet development, a process of bonding a partition wall separately formed, a process of forming a partition wall by a printing method, or the like may be used.

Besides films of plastics such as polyethylene terephthalate (PET), polycarbonate (PC) and poly(ether sulfone) (PES), glass, quartz and the like may be used in substrates 1a, 1b. A transparent material must be used for substrate 1a on the observer side, but a colored material such as polyimide (PI) may be used for substrate 1b on the other side.

As materials of display electrodes 5a, 5b and control electrode 6, any material may be used so far as they are conductive material capable of patterning. For example, metals such as titanium (Ti), aluminum (Al) and copper (Cu) or carbon and silver paste may be used. When first display electrode 5a is also used as a light reflection layer, a material high in light reflectance, such as silver (Ag) or aluminum (Al) may be suitably used. When this first display electrode 5a is used for white display, irregularities are given to the surface of the display electrode itself so as to undergo irregular reflection, or a light scattering layer is formed on the display electrode.

As insulating liquid 2, may preferably be used a transparent non-polar solvent such as isoparaffin, silicone oil, xylene or toluene.

As charged electrophoretic particles 3, may preferably be used a material which is colored and exhibits good positive or negative charge characteristics in the insulating liquid. For example, various kinds of inorganic pigments or organic pigments, carbon black, or resins containing them may be suitably used. The particle diameter of the particles used is generally about 0.01 to 50 $\mu$m, preferably about 0.1 to 10 $\mu$m.

A charge control agent may preferably be contained in the insulating liquid and charged electrophoretic particles for the purpose of controlling and stabilizing the charging of the charged electrophoretic particles. As such a charge control agent, may preferably be used a metal complex of a monoazo dye, salicylic acid, organic quaternary ammonium salt, nigrosine compound and so forth.

A dispersing agent may be added to the insulating liquid for the purpose of preventing aggregation among the charged electrophoretic particles to maintain a good dispersed state. As such a dispersing agent, may be used a polyvalent metal salt of phosphoric acid such as calcium phosphate and magnesium phosphate, a carbonate such as calcium carbonate, any other inorganic salt, an inorganic oxide, an organic polymeric material and so forth.

A production process of the electrophoretic display device will now be described with reference to FIGS. 8A to 8D.

Figure 8A:
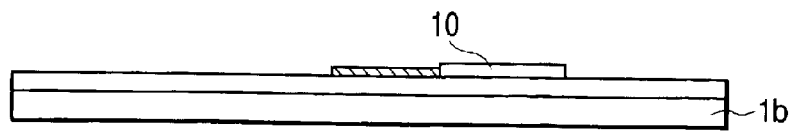
FIGS. 8A, 8B, 8C and 8D illustrate exemplary production processes of the electrophoretic display device according to the present invention.
Figure 8B:
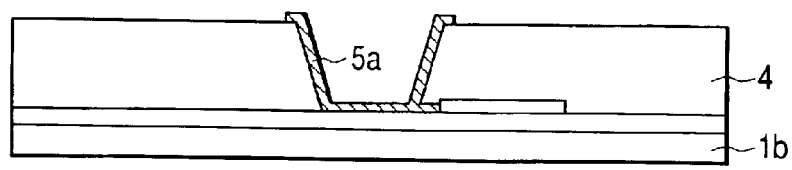
Figure 8C:
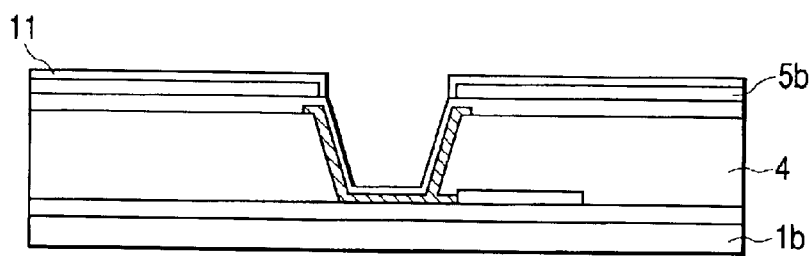
Figure 8D:
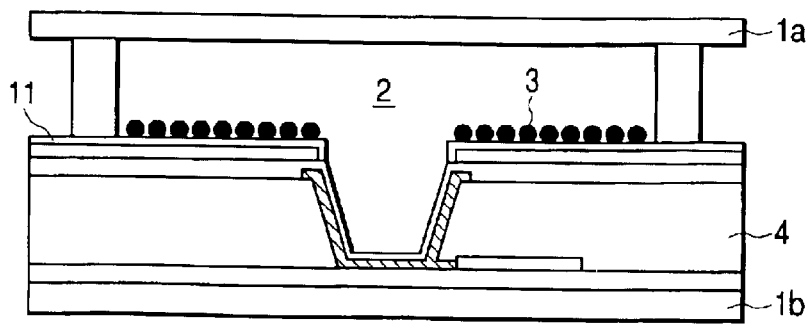
Figure 9A:
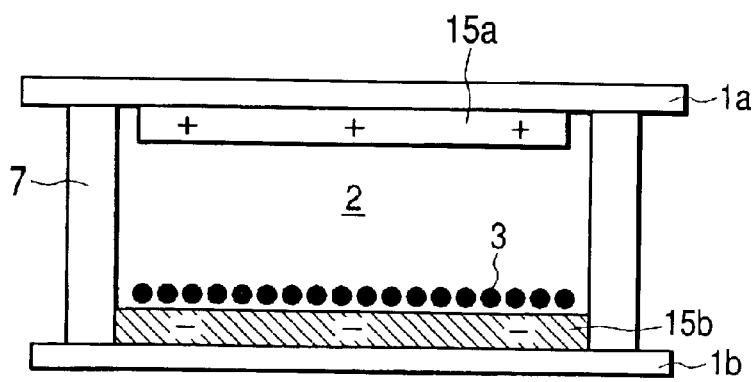
FIGS. 9A and 9B illustrate an example of the construction of a conventional electrophoretic display device.
Figure 9B:
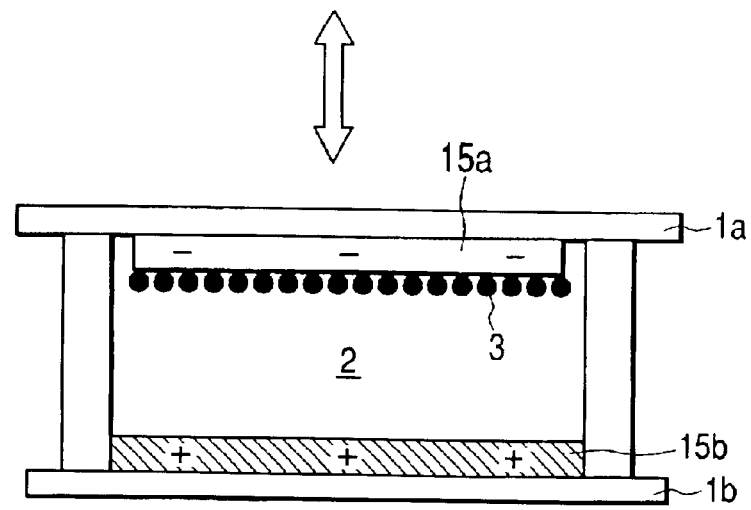
Figure 10A:
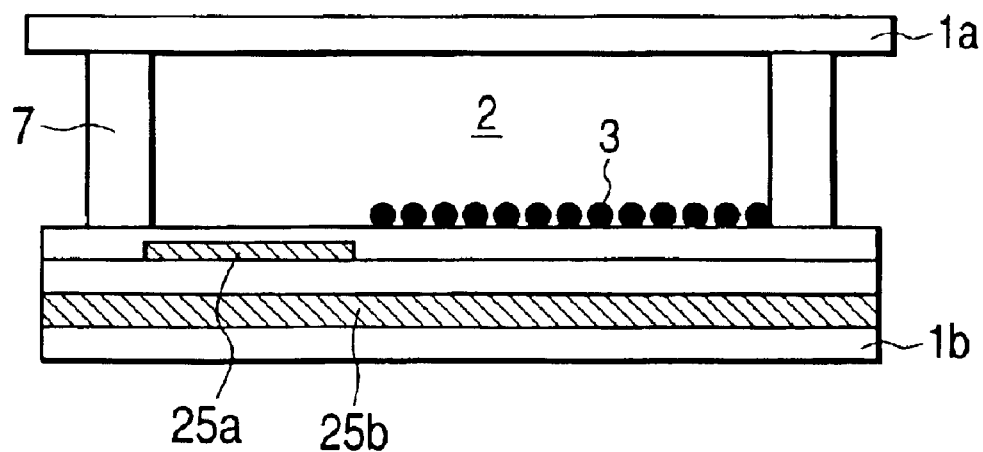
FIGS. 10A and 10B illustrate an example of the construction of another conventional electrophoretic display device.
Figure 10B:
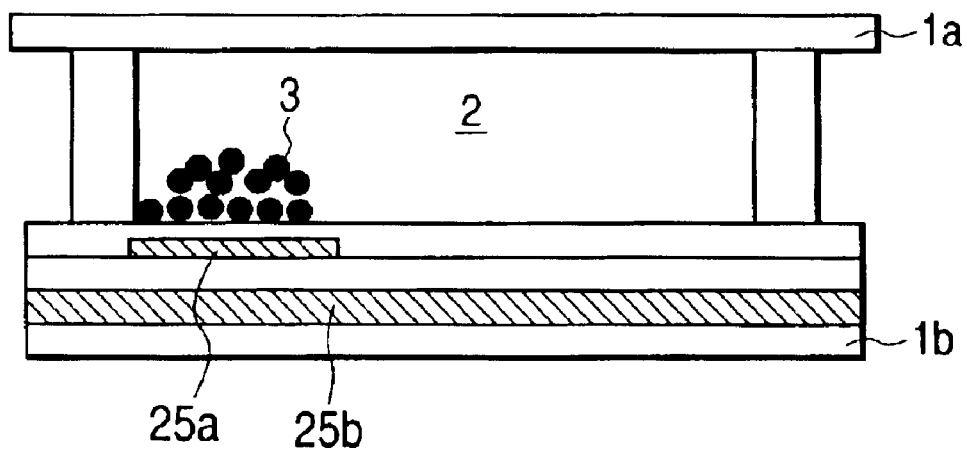

A switching element 10, a stage 4, a first display electrode 5a and a second display electrode 5b are first formed at every pixel on a second substrate 1b (see FIGS. 8A, 8B and 8C). Stage 4 may be formed either by a molding method using a mold or by a photolithographic method using a photosensitive resin. The order of the formation includes two methods. One of them is a method in which a pattern of second display electrode 5b is first formed, an insulating layer 11 is formed thereon, and a reverse tapered first display electrode 5a is then formed, and the other is a method in which a concave first display electrode 5a is formed, an insulating layer 11 is formed thereon, and a pattern of second display electrode 5b is then formed.

Thereafter, substrates 1a and 1b are laminated, and an insulating liquid 2 and charged electrophoretic particles 3 are filled.

As described above, according to the present invention, first display electrode 5a is arranged so as to extend from a position along the lower surface $F_1$ to the side wall portion of the recessed part E (particularly, so as to cover the side wall portion with first display electrode 5a), and so an electric field for causing charged electrophoretic particles 3 to migrate is concentrated within the recessed part, whereby charged electrophoretic particles 3 can be efficiently driven. When the whole side wall portion of the recessed part E is covered with the third electrode, a leakage electric field leaked out of a boundary portion between first and second display electrodes 5a and 5b from wirings or the like can be completely shielded.

The recessed part E is combined with a role of a contact hole between the pixel switching element or driving wiring and first display electrode 5a, whereby the numerical aperture can be prevented from being lowered by the formation of contact.

The present invention will hereinafter be described in more detail by the following examples.

EXAMPLE 1

An electrophoretic display device shown in FIG. 1 was fabricated in this example. The actual number of pixels in the display device fabricated was 900 (30×30), and the size of one pixel was 600 $\mu$m×600 $\mu$m. The size $P_1$ of one first display electrode 5a viewed from the display surface side was 60 $\mu$m×45 $\mu$m, and the size of the bottom of the recessed structure was 40 $\mu$m×25 $\mu$m. Such recessed parts were arranged by 25 within each pixel. In this display device, the proportion of an area $P_2$ of the second display electrode to the display area in each display pixel, i.e., the so-called numerical aperture was 81%. A difference in level between an upper surface $F_2$ and a lower surface $F_1$ was 15 $\mu$m.

The production process of the electrophoretic display device according to this example will now be described.

A glass sheet having a thickness of 1.1 mm was used as a substrate 1b (hereinafter referred to as "back-side substrate"; and a substrate located on the upper side in FIG. 1 as "display-side substrate") located on the lower side in FIG. 1. A thin-layer transistor 10, and besides wirings, IC and the like (not illustrated) necessary for driving were formed on this surface of the back-side substrate 1b.

A stage 4 was then formed by a photo-setting resin on the back-side substrate 1b. A first display electrode 5a was formed in a recessed part $E_1$, and at the same time a third electrode was formed on the side wall. A region from the surface of the electrode 5a to the surface of the stage was covered with an insulating layer 9. A second display electrode 5b formed of aluminum was formed on the surface (upper surface $F_2$) of this insulating layer 9. This electrode was covered with an acrylic resin layer 11 containing fine particles of titanium oxide. In this example, second display electrode 5*b* reflects light, and acrylic resin layer 11 exhibits a light scattering effect.

A partition wall 7 was formed at a boundary portion between pixels, and an insulating liquid 2 and charged electrophoretic particles 3 were filled into each pixel. Isoparaffin (Isopar, trade name, product of EXSSON Company) was used as insulating liquid 2, and particles of a polystyrene-polymethacrylate copolymer resin containing carbon black having a particle diameter of about 1 to 2 $\mu$m were used as charged electrophoretic particles 3. Succinimide (OLOA 1200, trade name, product of Chevron Chemical Co.) was contained as a charge control agent in isoparaffin.

A display operation was performed by using the display device fabricated to determine display characteristics. As a result, none of deterioration of display by a leakage electric field from wirings or the like, and the like were observed at all.

Charged electrophoretic particles 3 were arranged within the recessed part $E_1$ in a state adsorbed on first display electrode 5*a*, and not arranged on this side from second display electrode 5*b*, and did not remain in the recessed part in a state adsorbed on second display electrode 5*b*. The display contrast achieved was as high as 10:1.

EXAMPLE 2

An electrophoretic display device shown in FIG. 5 was fabricated in this example.

In this example, a fourth electrode was arranged in addition to a third electrode. An end portion of the fourth electrode overlapped a second display electrode 5*b* through an insulating layer. The fourth electrode was arranged nearer to a display-side substrate (first substrate) 1*a* than the surface of the second display electrode. The actual number of pixels in the display device fabricated was 900 (30×30), and the size of one pixel was 960 $\mu$m×960 $\mu$m. The size $P_1$ of one first display electrode 5*a* viewed from the display surface side was 40 $\mu$m in diameter, and the size of the bottom of the recessed structure was 30 $\mu$m in diameter. Such recessed parts were arranged by 140 within each pixel. In this display device, the proportion of an area $P_2$ of the second display electrode to the display area in each display pixel, i.e., the so-called numerical aperture was 80%. A difference in level between an upper surface $F_2$ and a lower surface $F_1$ was 18 $\mu$m.

A display operation was performed by using the display device fabricated to determine display characteristics. As a result, none of deterioration of display by a leakage electric field from wirings or the like, and the like were observed at all.

Charged electrophoretic particles 3 were arranged within the recessed part $E_4$ in a state adsorbed on first display electrode 5*a*, and not arranged on this side from second display electrode 5*b*, and did not remain in the recessed part in a state adsorbed on second display electrode 5*b*. The display contrast achieved was as high as 11:1.

EXAMPLE 3

An electrophoretic display device shown in FIG. 3 was fabricated in this example. This display device was provided as the so-called direct drive type that wirings were separately made in respective pixels.

A polyethylene terephthalate (PET) resin film having a thickness of 0.2 mm was used as a back-side substrate 1*b*, and wirings were formed on the surface of this back-side substrate 1*b*. The actual number of pixels in the display device fabricated was 150 (15×10), and the size of one pixel was 5 mm×5 mm. The size $P_1$ of one first display electrode 5*a* viewed from the display surface side was 40 $\mu$m×4,900 $\mu$m, and the size of the bottom of the recessed structure was 20 $\mu$m×4,880 $\mu$m. Such recessed parts were arranged by 19 within each pixel. In this display device, the proportion of an area $P_2$ of the second display electrode to the display area in each display pixel, i.e., the so-called numerical aperture was 85%. A difference in level between an upper surface $F_2$ and a lower surface $F_1$ was 18 $\mu$m.

A stage 4 was then formed by a thermoplastic resin on the back-side substrate 1*b*. A first display electrode 5 *a* and a third electrode on the side wall were formed by titanium in a recessed part $E_3$. The surface of the electrode 5*a* was then covered with a black resist. An insulating layer 9 composed of an acrylic resin was formed from the surface of the first display electrode 5*a* to the surface of the stage 4. A second display electrode 5*b* composed of aluminum was formed on the surface (upper surface $F_2$) of this insulating layer 9. This electrode was covered with an acrylic resin layer 11 containing fine particles of titanium oxide. In this example, second display electrode 5*b* reflects light, and acrylic resin layer 11 exhibits a light scattering effect.

A partition wall 7 was formed at a boundary portion between pixels, and an insulating liquid 2 and charged electrophoretic particles 3 were filled into each pixel. Isoparaffin (Isopar, trade name, product of EXSSON Company) was used as insulating liquid 2, and particles of a polystyrene-polymethacrylate copolymer resin containing carbon black having a particle diameter of about 1 to 2 $\mu$m were used as charged electrophoretic particles 3. Succinimide (OLOA 1200, trade name, product of Chevron Chemical Co.) was contained as a charge control agent in isoparaffin.

A display operation was performed by using the display device fabricated to determine display characteristics. As a result, none of deterioration of display by a leakage electric field from wirings or the like, and the like were observed at all.

Charged electrophoretic particles 3 were arranged within the recessed part $E_3$ in a state adsorbed on first display electrode 5*a*, and not arranged on the surface of second display electrode 5*b*, and did not remain in the recessed part in a state adsorbed on second display electrode 5*b*. The display contrast achieved was as high as 11:1.

According to the present invention, the first display electrode is arranged so as to extend along the lower surface, which is a bottom of the recessed part, and a great number of charged electrophoretic particles can be received within the recessed part. Accordingly, the region occupied by the first display electrode can be narrowed (namely, an area ratio of the region occupied by the second display electrode can be made high) to enhance contrast. Since the charged electrophoretic particles are received in the recessed part lower than the upper surface, the whole area of the second display electrode can be visually observed (without causing portions not seen by shadows of the charged electrophoretic particles, even when visually observed from all directions such as an inclined direction), and no lowering of contrast occurs. Since the second display electrode is arranged so as to cover the display surface (upper surface) excluding the recessed part, a leakage electric field from wirings or the like arranged on the second substrate side can be shielded to improve display quality.

When the third electrode is provided on the side wall of the recessed part in such a manner that the first display electrode is arranged so as to extend from a position along the lower surface to the side wall portion of the recessed part (in particular, the side wall portion is covered with the first display electrode), electric fields for causing the charged electrophoretic particles to migrate are all directed from the bottom of the recessed part to the first substrate, whereby the charged electrophoretic particles can be efficiently driven.

When the fourth electrode is provided on the upper surface of the stage in such a manner that the first display electrode is arranged so as to extend from a position along the lower surface to a position between the second display electrode and the first substrate, an effect that the driving speed of the charged electrophoretic particles can be improved is brought about. When the first display electrode is arranged so as to extend from a position along the lower surface to a position between the second display electrode and the second substrate, contrast can be more enhanced. When the first display electrode is arranged so as to extend from a position along the lower surface to the same height as the second display electrode, the first and second display electrodes can be made at the same time upon the production of the device, thereby bringing about an effect on the reduction in production cost.

The recessed part is also combined with a role of a contact hole between the pixel switching element or driving wiring and the first display electrode, whereby the numerical aperture can be prevented from being lowered by the formation of contact.

What is claimed is:

1. An electrophoretic display device, comprising:

first and second substrates arranged in opposed relation to each other with a space;

an insulating liquid arranged in the space and a plurality of colored and charged electrophoretic particles dispersed in the insulating liquid, in which on the basis of arrangement of a stage along the second substrate in the space between the substrates, a first surface facing a thicker portion of the insulating liquid, a second surface facing a thinner portion of the insulating liquid and a side wall of the stage, which connects the first surface to the second surface, are formed on the second substrate;

a first electrode arranged along the first surface; and a second electrode is arranged along the second surface, wherein the first electrode extends to the side wall of the stage so as to form a third electrode arranged along at least a part of the side wall of the stage and forming an electrode face continuous with the first electrode.

2. The electrophoretic display device according to claim 1, wherein the third electrode is arranged over an entire side wall portion of the stage, and a fourth electrode is further arranged along the second surface with a prescribed width adjoiningly to the side wall of the stage so as to form an electrode face continuous with the third electrode.

3. The electrophoretic display device according to claim 2, wherein at least a part of the fourth electrode overlaps at least a part of the second electrode through an insulating layer.

4. The electrophoretic display device according to claim 3, wherein the overlapped portion of the fourth electrode is located between the second electrode and the second substrate.

5. The electrophoretic display device according to claim 3, wherein the overlapped portion of the fourth electrode is located between the second electrode and the first substrate.

6. The electrophoretic display device according to claim 2, wherein the fourth electrode is arrange laterally to the second electrode.

7. The electrophoretic display device according to claim 1, wherein the side wall of the stage is an inclined surface formed at an angle of 20° to 80° from a direction perpendicular to the second substrate.

8. The electrophoretic display device according to claim 1, wherein the area of the second electrode is larger than the sum total of areas of the first electrode and an electrode continuous therewith viewed from the direction perpendicular to the second substrate.

9. The electrophoretic display device according to claim 1, wherein a region in which the first electrode has been formed and a region in which the second electrode has been formed are colored in colors different from each other.

10. The electrophoretic display device according to claim 1, wherein the stage, the first surface, the second surface, the side wall of the stage, the first electrode and the third electrode continuous therewith, and the second electrode are formed at every pixel, and signals are supplied to the first electrode and the third electrode continuous therewith through a switching element.

11. The electrophoretic display device according to claim 10, wherein the switching element is connected to the first electrode.

12. The electrophoretic display device according to claim 1, wherein wirings or switching elements connected to the first electrode and the third electrode continuous therewith and the second electrode, or both thereof are shielded by any one of the face of the first electrode and the third electrode continuous therewith and the face of the second electrode or the faces of both electrodes and arranged at respective positions at which no electrical influence is exerted to the region in which the charged electrophoretic particles are present.

* * * * *

UNITED STATES PATENT AND TRADEMARK OFFICE
CERTIFICATE OF CORRECTION

PATENT NO. : 6,741,385 B2
DATED : May 25, 2004
INVENTOR(S) : Tsutomu Ikeda et al.

It is certified that error appears in the above-identified patent and that said Letters Patent is hereby corrected as shown below:

Column 1,
Line 22, "and" should read -- and be --.
Line 25, "reflected" should read -- reflecting --.
Line 30, "These" should be deleted.
Lines 31-34 should be deleted.

Column 2,
Line 40, "(sec" should read -- (see --.

Column 6,
Line 35, "5a, 5b." should read -- 5a, 5b, …,. --.
Line 43, "5d" (second occurrence) should read -- 5b --.

Column 7,
Line 9, "surrounding" should read -- surround --.

Column 10,
Line 13, "5 a" should read -- 5a --.

Column 11,
Line 45, "is" should be deleted.

Column 12,
Line 16, "arrange" should read -- arranged --.

Signed and Sealed this

Fifteenth Day of February, 2005

JON W. DUDAS
*Director of the United States Patent and Trademark Office*